UNITED STATES PATENT OFFICE.

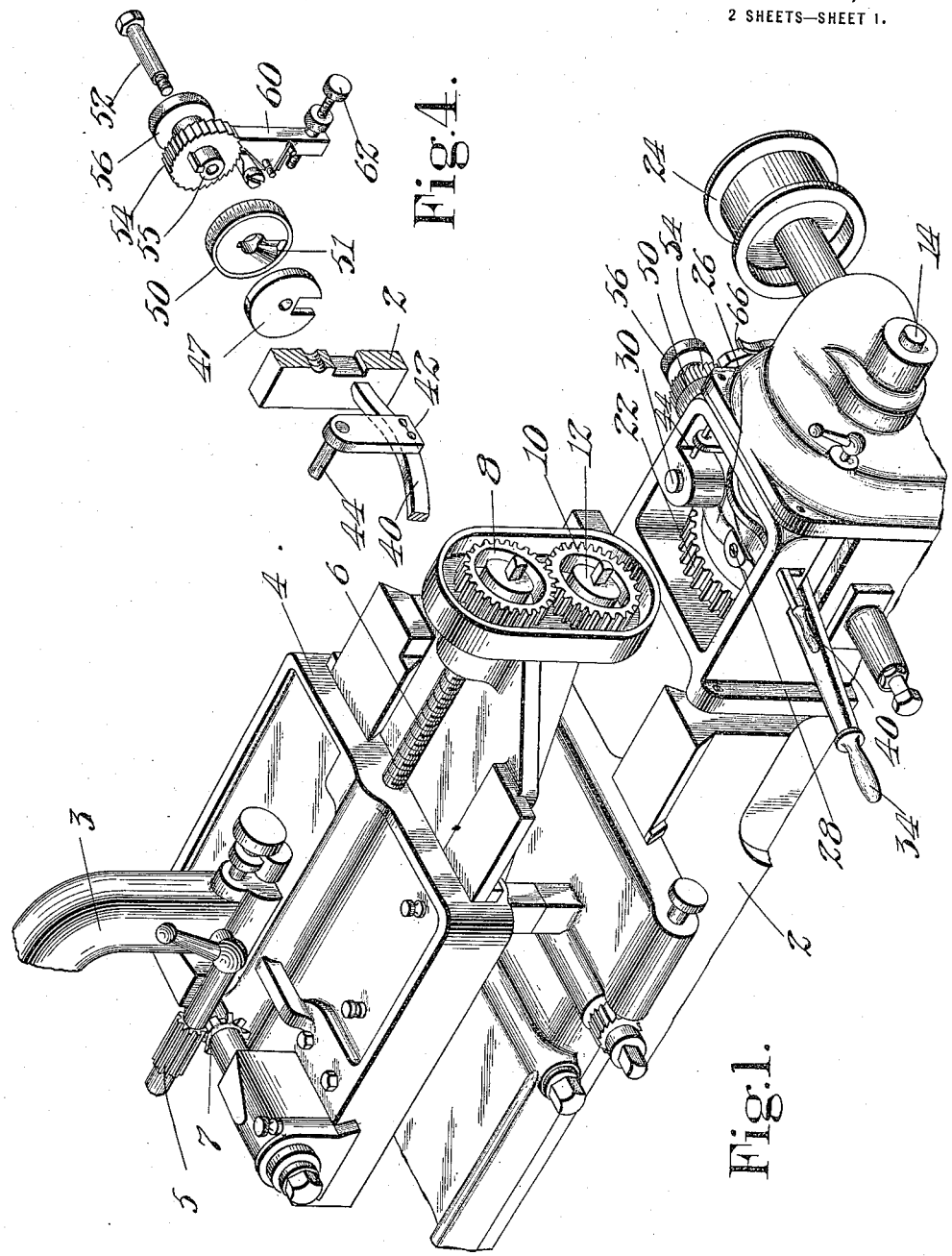

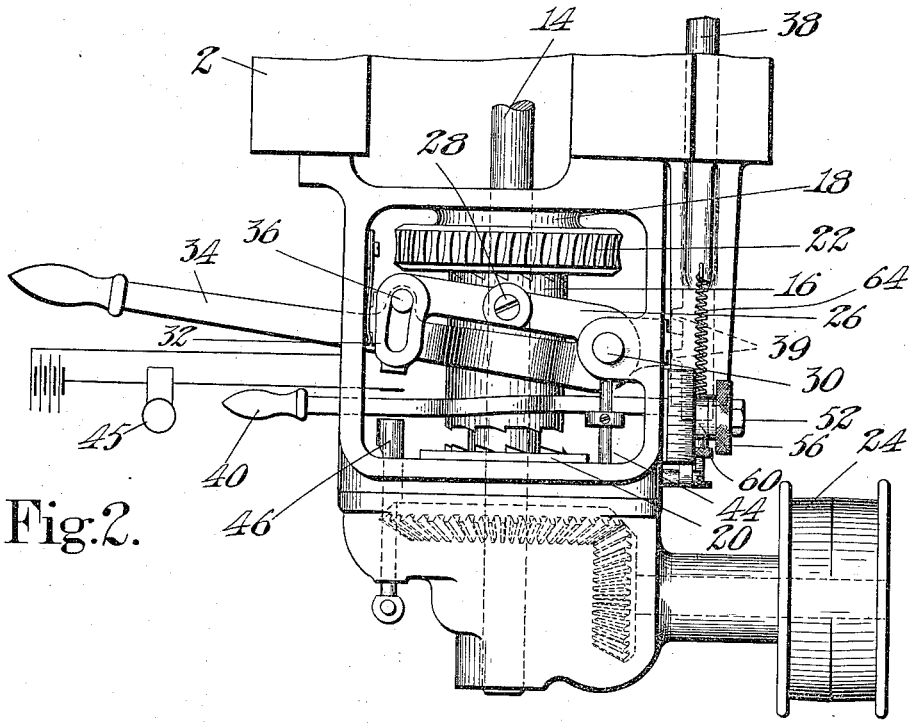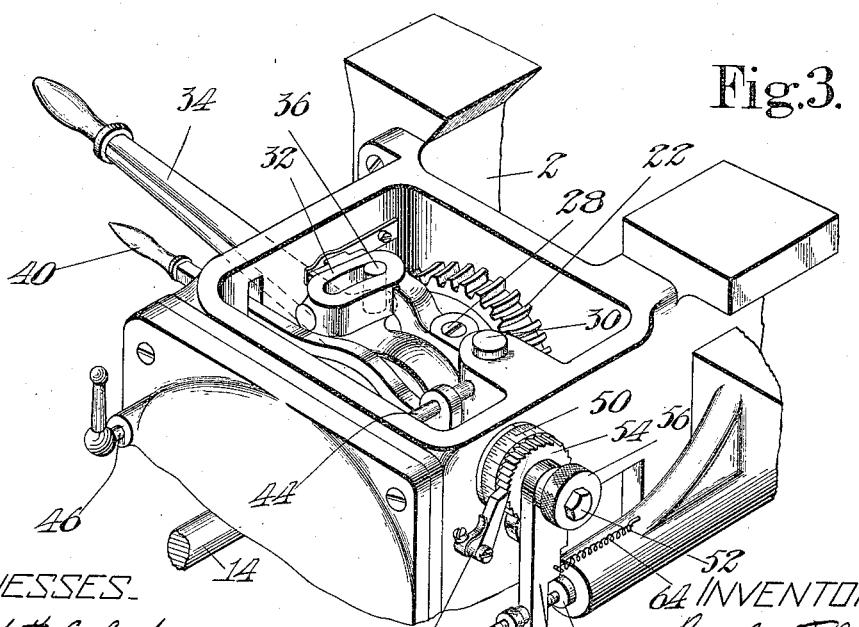

REUBEN T. BAISLEY, OF BILLERICA, MASSACHUSETTS, ASSIGNOR TO UNITED SHOE MACHINERY COMPANY, OF PATERSON, NEW JERSEY, A CORPORATION OF NEW JERSEY.

STOPPING MECHANISM.

1,158,619.

Specification of Letters Patent.

Patented Nov. 2, 1915.

Application filed November 11, 1912. Serial No. 730,589.

*To all whom it may concern:*

Be it known that I, REUBEN T. BAISLEY, a citizen of the United States, residing at Billerica, in the county of Middlesex and State of Massachusetts, have invented certain Improvements in Stopping Mechanisms, of which the following description, in connection with the accompanying drawings, is a specification, like reference characters on the drawings indicating like parts in the several figures.

This invention relates to automatic stopping mechanism for gear cutting or other similar machines which operate to perform a predetermined number of operations upon the work and are then brought to rest.

The invention is herein disclosed as applied to a gear cutting machine having a stationary work support and a movable tool carrier for a milling cutter, the latter being arranged to cut one tooth in a gear blank each time the carrier is reciprocated and the blank being turned to the proper position for a new tooth after each reciprocation of the tool carrier. Heretofore in machines of this type the operation has been automatic except for starting and stopping of the machine but it has necessitated the watchful attention of the operator to insure that the machine should be stopped when the desired number of teeth have been cut. The present invention contemplates the provision of a novel form of automatic stopping means for such a machine, whereby, after a predetermined number of teeth have been cut, the machine will be automatically brought to rest. The importance of such stopping mechanism is apparent in case it is desired to cut high grade gears. With such work in hand it is important that the milling tool shall make but a single traverse of the work in forming each tooth of the gear as a second traverse of a previously cut tooth is likely to introduce inaccuracy in the work. In operating upon a segment or other irregular member having less than a whole circumference, or having parts projecting beyond the diameter of the gear teeth it is still more important to stop the gear cutting machine after the required number of teeth have been cut because in such cases if the work is rotated one step too far such projection is likely to bring up against a stationary part of the machine frame and not only damage the work itself but bend the arbor upon which it is mounted.

In the embodiment of the invention herein shown the automatic stopping mechanism is associated with the reversing clutch which controls the direction of movement of the tool carrier. Such arrangement is advantageous because it facilitates the application of automatic stopping mechanism to machines already constructed or even those already in use.

These and other features of the invention will be best understood and appreciated from the following description of a preferred embodiment thereof selected for purposes of illustration and shown in the accompanying drawings in which,—

Figure 1 is a view in perspective of portions of a gear cutting machine having embodied therein the automatic stopping mechanism of my invention; Figs. 2 and 3 are plan and perspective views respectively of the reversing mechanism of the machine showing the automatic stopping mechanism; Fig. 4 is a view in perspective of the parts of the stopping mechanism.

In Fig. 1 there is disclosed enough of a gear cutting machine of well known type to enable the operation of the automatic stopping mechanism to be understood. As therein shown, the machine frame 2 is provided with an overhanging stationary arm 3 having a journal for one end of an arbor upon which the gear blank 5 is mounted. Beneath the arm 3 are horizontal ways for the tool carrier 4 on which is mounted a rotatable spindle for the milling cutter 7. This spindle is positively rotated by means, not shown, while the carrier 4 is reciprocated by the rotation of a lead screw 6 threaded into the carrier and having at its outer end a pinion 8. The pinion 8 meshes with another pinion 10 on a shaft 12 which may be driven through any suitable connections by the shaft 14.

The shaft 14 has keyed to it a sliding clutch member 16 which is arranged to be moved into engagement either with the driven clutch member 18, Fig. 2, or the reversely driven clutch member 20. The clutch member 18 is fast to a worm gear 22 by which it is driven at a slow rate of speed by suitable connection with the main shaft of the machine. When the loose clutch member 16 is engaged with the member 18 a slow advancing movement is imparted to the carrier 4 and during this movement the milling tool 7 cuts out one tooth in the blank. The other clutch member 20 is connected by suitable bevel gears to the belt pulley 24 by which it is driven at a high rate of speed in the opposite direction from the clutch member 18. When the loose clutch member 16 is moved into engagement with the clutch member 20 a rapid reverse movement is imparted to the shaft 14 and the carrier 4 is returned to initial position at a speed much higher than that of its working stroke.

The loose clutch member is shifted by the oscillation of an arm 26 to which it is connected by a stud 28. The arm 26 is pivoted upon a vertical pin 30 and provided at its opposite end with a lateral extension 32 in which is formed a curved slot. Also pivotally mounted upon the pin 30 is a shifting lever 34 which has a stud 36 extending upwardly into the slot in the extension 32 of the arm 26. It will be seen that when the lever 34 is swung in one direction or the other, after a certain amount of lost motion has occurred, the stud 36 will act to swing the arm 26 and so shift the loose clutch member.

In the normal operation of the machine the lever 34 is swung alternately in opposite directions by the reciprocation of a rod 38 which has two projecting ears 39 arranged to act upon a projection on the rear end of the lever 34. The means for reciprocating the rod 38 are not shown herein as they form no part of the invention. Any desired mechanism, however, may be employed to shift the rod 38 in the proper time relation to the movement of the carrier 4 as will be apparent.

Ordinarily the movement of the arm 26 is limited only by the engagement of the clutch member 16 with one or the other driven member of the clutch. It will be apparent, however, that if the movement of this arm is arrested so as to hold the clutch member 16 in mid position and out of engagement with either driving member of the clutch, then the machine will be brought to rest. The stopping mechanism herein disclosed is intended to insure this occurrence after the carrier 4, and consequently the rod 38, have made a predetermined number of reciprocations and the arbor carrying the gear blank has been turned a predetermined number of steps. To this end a stopping lever 40 is secured to the lower end of a short vertical arm 42 pivotally mounted upon a horizontal spindle 44. In its inoperative position the lever 40 is held above and out of range of the arm 26 but in its operative position the lever is arranged to stand in the path of the end of the extension 32 and arrest the arm as it is moved to shift the loose clutch member out of engagement with the driving clutch member 18. In this position, therefore, the stopping lever 40 prevents the clutch member 16 from being moved into engagement with the clutch member 20 and so brings the machine to rest. The impact of the lever 34 and arm 26 upon the stopping lever 40 is taken care of by a stop 46 set in the machine frame.

The lever 40 is so proportioned that it tends to fall by gravity into stopping position. In is held, however, in inoperative position during the operation of the machine by engaging the periphery of a controlling disk 50 mounted upon a stud 52 set in the machine frame and spaced from the frame by a washer 47. The controlling disk 50 has a recess 51 into which the end of the lever 40 may pass when the disk has been turned to a predetermined position. The disk 50 is keyed to a ratchet wheel 54 rigidly secured to a sleeve 55 to which is secured a knurled nut 56. The sleeve 55 furnishes bearings for the controlling disk 50 and ratchet wheel 54 and is arranged to turn with these parts upon the stud 52. The controlling disk 50 carries an index scale upon its periphery and may be set in any desired initial position by turning the knurled nut 56. The ratchet wheel 54 and the controlling disk 50 are rotated step by step in time with the reciprocation of the carrier 54 by means of a pawl 60, journaled upon the stud 52, and arranged to be engaged at its lower end by the end of the rod 38 each time the latter is moved rearwardly. An adjustable stop is provided in the lower end of the pawl 60 in order to regulate its throw and a tension spring 54 serves to move the pawl in opposition to the rod 38. Suitable dogs 66 are provided for preventing the reverse rotation of the ratchet wheel 54.

In operation, the controlling disk 50 will be set preliminarily in accordance with the number of teeth it is desired to cut in the blank in hand. The scale upon the periphery of the controlling disk will indicate that the recess 51 is initially set at sixteen steps from its effective position if, for example, it is desired to cut sixteen teeth in the blank. The machine is then started and as each tooth is completed the pawl 60 turns the controlling disk one step. When the sixteenth tooth has been completed the ensuing movement of the pawl brings the recess 51 into register with the end of the stopping lever 40 thereby permitting the latter to drop into its operative position between the extension 32 on the shifting arm 26 and the stop 46. The movement of the shifting arm is thus arrested and the friction member 16 brought to rest in its intermediate position. When it is desired to start the machine again the stopping lever 40 is raised by hand, the controlling disk turned so as to hold it in elevated position, and finally the lever 34 is shifted by hand into engagement with the driven member 18 of the clutch.

It is desirable that the operator shall be warned when the machine is brought to rest in order that he may set up a new piece of work without waste of time. To this end the present invention contemplates the provision of means for giving an audible signal when the stopping lever 40 acts to stop the machine. As herein shown this is effected by automatically closing a circuit through an electric bell 45 when the stopping lever 40 is engaged by the extension 32 of the arm 26. The bell 45 with its battery and connections are graphically illustrated in Fig. 2 from which it will be seen that one side of the circuit is connected to a spring on the inside of the gear casing which is arranged to contact with the extension 32 while the other terminates in a spring disposed normally between the extension 32 and the stopping lever 40. When the machine is stopped the circuit is closed and the bell 45 will continue to ring until the stopping lever 40 is lifted to its initial position by the operator.

Having thus described my invention, I claim as new and desire to secure by Letters Patent of the United States:

1. A gear cutting machine having a relatively movable work holder and tool, a clutch member movable in opposite direction for automatically controlling the direction of such relative movement, automatic means for rendering the clutch member inoperative after a predetermined number of relative movements of the work and tool, and rotatable means for preliminarily determining the number of such movements.

2. A machine of the class described having, in combination, a relatively movable work holder and tool, driving means including a loose clutch member movable in opposite directions as the direction of movement of the holder and tool is reversed, automatic means for stopping the loose clutch member in an intermediate inoperative position after a predetermined number of relative movements of the work and tool, and rotatable means arranged to be set preliminarily to determine the number of such movements.

3. A machine of the class described having, in combination, a movable tool holder, actuating means therefor including a clutch having oppositely driven fast members and an intermediate loose member, automatic means for shifting the loose member into and out of engagement with the respective driven members at the conclusion of each operation of the machine, and means including a rotatable controller arranged to operate automatically after a predetermined number of operations to stop the clutch member in an inoperative position.

4. A gear cutting machine having a movable tool carrier, driving mechanism for the carrier, a clutch having a movable loose member, means for moving the clutch member, and a stopping lever arranged to fall by gravity into such position as to arrest the movement of the clutch member after the latter has been shifted a predetermined number of times.

5. A gear cutting machine having a movable tool carrier, driving mechanism for the carrier, and means for interrupting the operation of the driving mechanism including a stopping lever constructed and arranged to fall by gravity into operative position, and a controlling disk which may be set to govern the number of movements of the carrier before permitting the stopping lever to fall.

6. A gear cutting machine having a movable tool carrier, driving mechanism for the carrier, and means for interrupting the operation of the driving mechanism, including a pivoted stopping lever, a controlling disk arranged to hold the stopping lever normally in an inoperative position, and ratchet mechanism for moving the controlling disk step by step from initial to releasing position.

7. A gear cutting machine having a movable tool carrier, driving mechanism for the carrier, means for interrupting the operation of the driving mechanism including a movable stopping lever, a controlling disk arranged to hold the stopping lever in an inoperative position, ratchet mechanism for moving the disk step-by-step to releasing position, and an audible signal arranged to be energized through the medium of the stopping lever after said lever has been released.

In testimony whereof I have signed my name to this specification in the presence of two subscribing witnesses.

REUBEN T. BAISLEY.

Witnesses:
RUTH E. WARD,
CHESTER E. ROGERS.